US011590463B2

(12) United States Patent
Shellie et al.

(10) Patent No.: US 11,590,463 B2
(45) Date of Patent: Feb. 28, 2023

(54) LIQUID-LIQUID MIXING DEVICE SUITABLE FOR SAMPLE PREPARATION BY LIQUID-LIQUID EXTRACTION

(71) Applicant: University of Tasmania, Sandy Bay (AU)

(72) Inventors: Robert Shellie, Burwood (AU); Masoomeh Tehrani Rokh, Ringwood (AU); Marcel Van Den Bronk, Ringwood (AU)

(73) Assignee: University of Tasmania, Sandy Bay (AU)

( * ) Notice: Subject to any disclaimer, the term of this patent is extended or adjusted under 35 U.S.C. 154(b) by 565 days.

(21) Appl. No.: 16/626,212

(22) PCT Filed: Jun. 28, 2018

(86) PCT No.: PCT/AU2018/050664
§ 371 (c)(1),
(2) Date: Dec. 23, 2019

(87) PCT Pub. No.: WO2019/000042
PCT Pub. Date: Jan. 3, 2019

(65) Prior Publication Data
US 2020/0122101 A1   Apr. 23, 2020

(30) Foreign Application Priority Data

Jun. 28, 2017  (AU) .............................. 2017902505

(51) Int. Cl.
*B01F 31/441*  (2022.01)
*B01F 23/40*  (2022.01)
(Continued)

(52) U.S. Cl.
CPC ............ *B01F 23/49* (2022.01); *B01F 31/441* (2022.01); *A45D 2200/058* (2013.01);
(Continued)

(58) Field of Classification Search
CPC ...................................................... B01F 31/441
(Continued)

(56) References Cited

U.S. PATENT DOCUMENTS 1,694,845 A * 12/1928 De Trey .............. B01F 33/5011
366/335
2,831,606 A * 4/1958 Alters ..................... F16N 37/00
222/246

(Continued)

FOREIGN PATENT DOCUMENTS

WO         99/17820 A1    4/1999

OTHER PUBLICATIONS

Dalpiaz, A. et al., "Synthesis and Study of E' -Ester Prodrugs of N6-Cyclopentyladenosine, a Selective A1 Receptor Agonist", Pharmaceutical Research, 18(4): 531-536 (2001).
(Continued)

*Primary Examiner* — David L Sorkin
(74) *Attorney, Agent, or Firm* — Merchant & Gould P.C.

(57) ABSTRACT

A liquid-liquid mixing device (10, 210) includes a barrel (20, 220) with a liquid port (23) at or adjacent one end. A plunger assembly (30) is reciprocably moveable along an axis in the barrel (20, 220) and includes a seal member (31, 231) and an agitator (50, 250). The seal member (31, 231) is in sealingly slidable engagement with the internal wall of the barrel (20, 220) to define a variable volume chamber (24, 224) therein in communication with the liquid port. The agitator (50, 250) is reciprocably moveable in the variable volume chamber (24, 224), which agitator (50, 250) includes one or more end to end passages (54) through which liquid in the chamber (24, 224) is forced as the agitator (250) reciprocates in the chamber (24, 224). The device (10) also includes a mode selector mechanism (60, 28, 46, 64, 65, 90, 92, 94, 96) for selection between at least two modes of
(Continued)

operation for the plunger assembly, wherein the mode selector mechanism (60, 28, 46, 64, 65, 90, 92, 94, 96) is adjustable between two or more modes whereby movement of the plunger assembly (30) effects either movement of the agitator (50, 250) with the seal member (31, 231) or movement of the agitator (50, 250) relative to the seal member (31, 231), depending on the selected mode.

33 Claims, 17 Drawing Sheets

(51) Int. Cl.
  *G01N 1/38* (2006.01)
  *B01F 23/43* (2022.01)
  *B01F 23/451* (2022.01)
  *B01F 35/75* (2022.01)

(52) U.S. Cl.
  CPC ............ *B01F 23/43* (2022.01); *B01F 23/451* (2022.01); *B01F 35/754251* (2022.01); *G01N 1/38* (2013.01)

(58) Field of Classification Search
  USPC .......................................... 222/246; 366/189
  See application file for complete search history.

(56) References Cited

U.S. PATENT DOCUMENTS

| | | | | |
|---|---|---|---|---|
| 3,164,303 | A * | 1/1965 | Trautmann | A61M 5/284 222/386 |
| 3,195,778 | A * | 7/1965 | Coates | B01F 33/50112 222/246 |
| 3,794,221 | A * | 2/1974 | Hostettler | B01F 35/7162 222/386 |
| 3,858,853 | A * | 1/1975 | Rausch | B65D 83/0005 366/279 |
| 4,454,231 | A | 6/1984 | Cais et al. | |
| 4,966,468 | A * | 10/1990 | Bruning | B65D 81/3255 222/386 |
| 5,273,190 | A | 12/1993 | Lund | |
| 5,630,800 | A * | 5/1997 | Blank | A61M 5/31596 604/82 |
| 5,725,500 | A | 3/1998 | Micheler | |
| 5,829,875 | A * | 11/1998 | Hagel | B65D 83/0005 222/386 |
| 6,105,822 | A | 8/2000 | Larsen et al. | |
| 6,406,175 | B1 * | 6/2002 | Marino | B01F 33/5011 366/139 |
| 7,018,089 | B2 * | 3/2006 | Wenz | B01F 33/50112 366/256 |
| 7,407,321 | B1 * | 8/2008 | Renfro | B01F 35/30 366/256 |
| 7,524,103 | B2 * | 4/2009 | McGill | B01F 35/713 366/195 |
| 8,128,591 | B2 * | 3/2012 | Simonton | B01F 35/7161 604/82 |
| 2004/0066706 | A1 | 4/2004 | Barker et al. | |
| 2004/0122359 | A1 | 6/2004 | Wenz et al. | |
| 2008/0177273 | A1 * | 7/2008 | deVries | B01F 31/441 606/93 |
| 2010/0292672 | A1 | 11/2010 | Lee | |
| 2016/0128752 | A1 | 5/2016 | Greter et al. | |

OTHER PUBLICATIONS

Guerin, T. et al., "Distribution and Dissipation of Endosulfan and Related Cyclodienes in Sterlie Aqueous Systems: Implications for Studies on Biodegradation", J. Agric. Food Chem., 40: 2315-2323 (1992).

Tsai, Y. et al., "Percutaneous Absorption of Capsaicin and Its Derivatives", Drug Development and Industrial Pharmacy, 20(4): 719-730 (1994).

Extended European Search Report for European Patent Application No. 18825268.8 dated Feb. 23, 2021, 8 pages.

Clavijo, S. et al., "In-syringe magnetic stirring-assisted dispersive liquid-liquid microextraction and silylation prior gas chromatography-mass spectrometry for ultraviolet filters determination in environmental water samples", Journal of Chromatography A, 1443: 26-34 (2016).

Giakisikli, G. et al., "Integrated Lab-in-Syringe Platform Incorporation a Membraneless Gas-Liquid Separator for Automatic Cold Vapor Atomic Absorption Spectrometry", Analytical Chemistry, 85: 8968-8972 (2013).

Henriquez, C. et al., "In-syringe magnetic-stirring-assisted liquid-liquid microextractio for the spectrophotometric determination of Cr(VI) in waters", Anal Bioanal Chem, 405: 6761-6769 (2013).

Liu, G. et al., "A method for long term stabilisation of long chain polyunsaturated fatty acids in dried blood spots and its clinical application", Prostaglandins, Leukotrienes and Essential Fatty Acids, 91: 251-260 (2014).

Maya, F. et al., "Lab in a syringe: fully automated dispersive liquid-liquid microextraction with integrated spectrophotometric detection", Anal Bioanal Chem, 404: 909-917 (2012).

Mitani, C. et al., "Automated headspace single-drop microextraction via a lab-in-syringe platform for mercury electrothermal atomic absorption spectrometric determination after in situ vapor generation", J. Anal at Spectrom, 29: 1491-1498 (2014).

International Search Report and Written Opinion of the International Searching Authority for corresponding International Patent Application No. PCT/AU2018/050664 dated Sep. 10, 2018, 10 pages.

\* cited by examiner

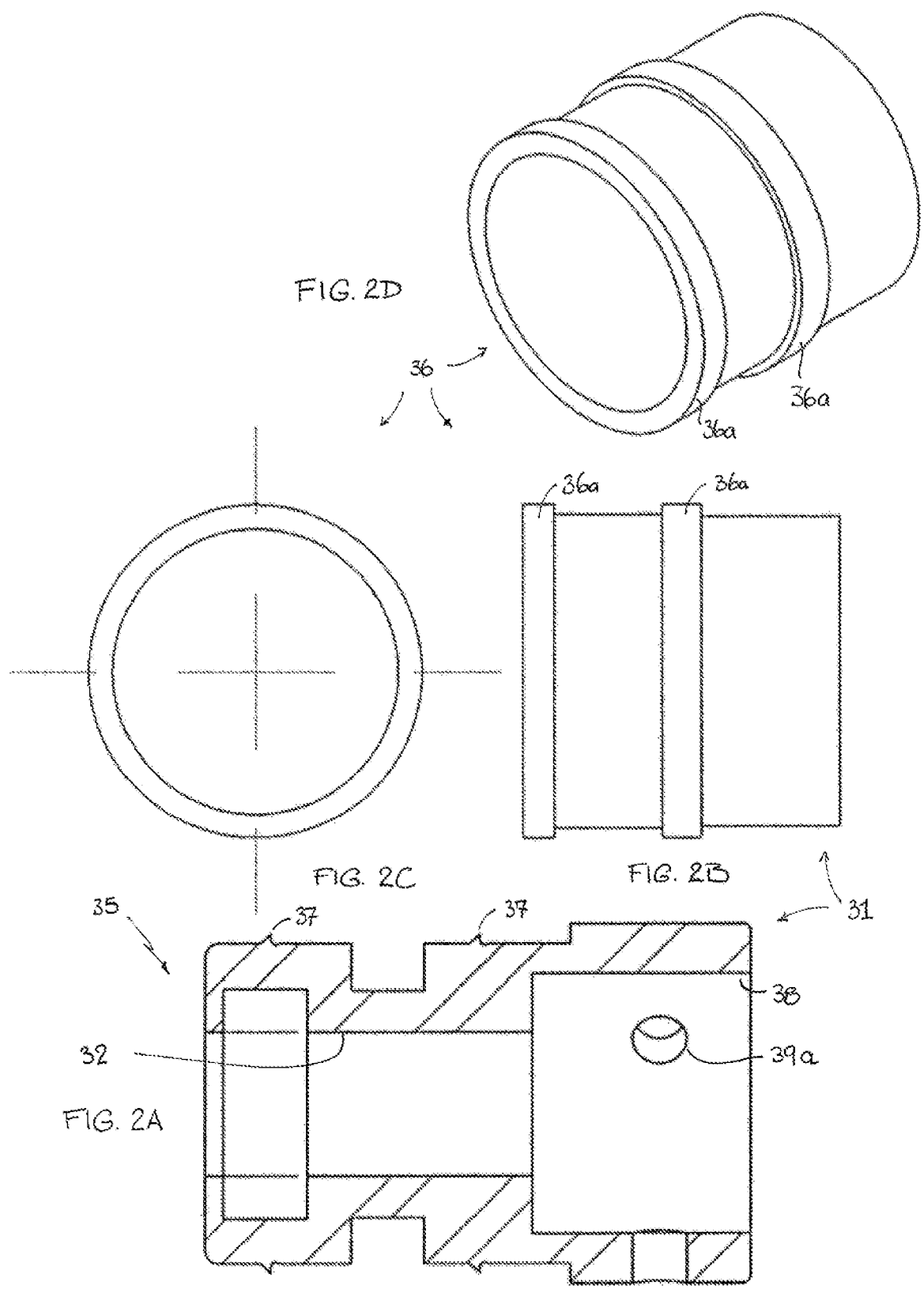

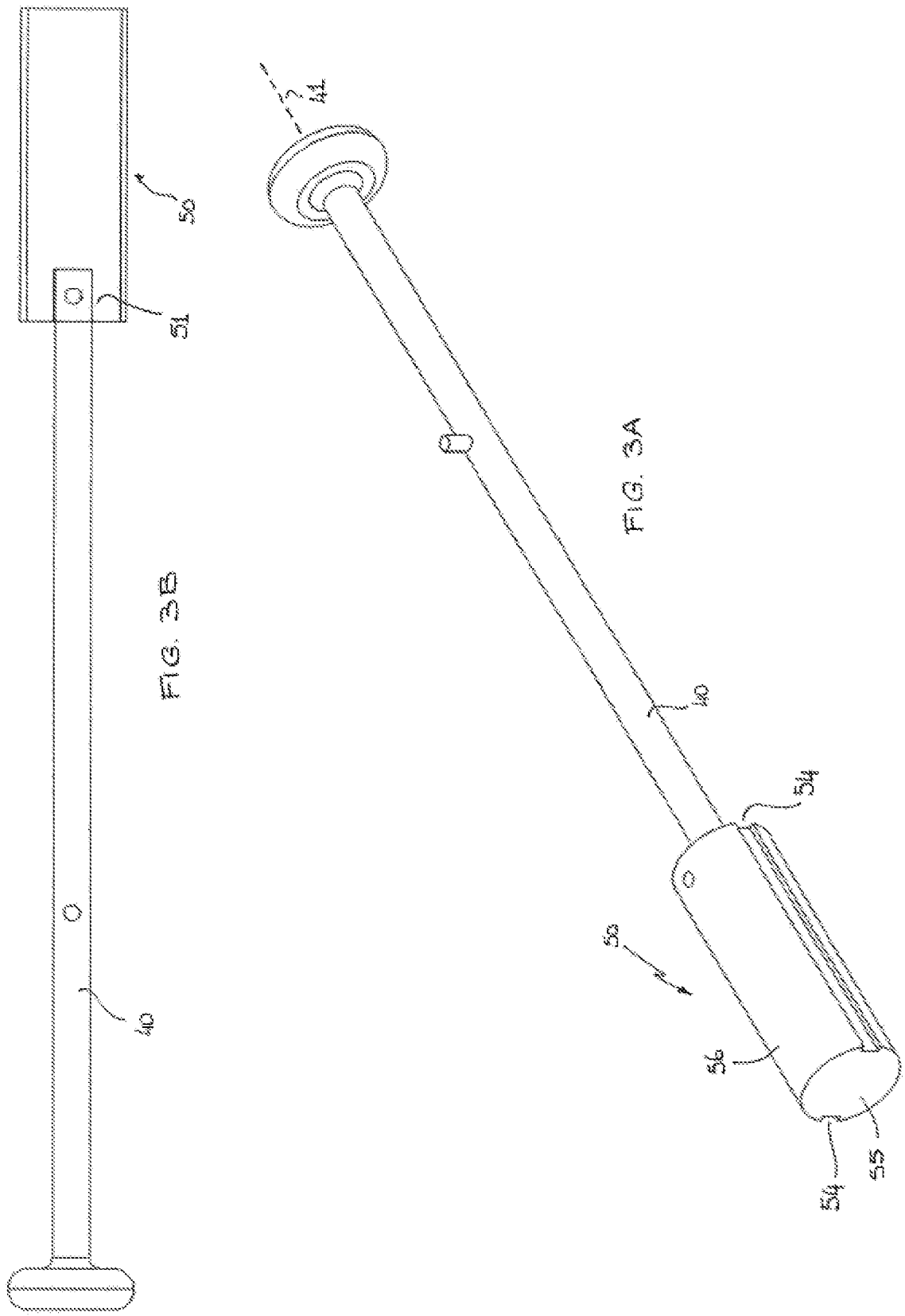

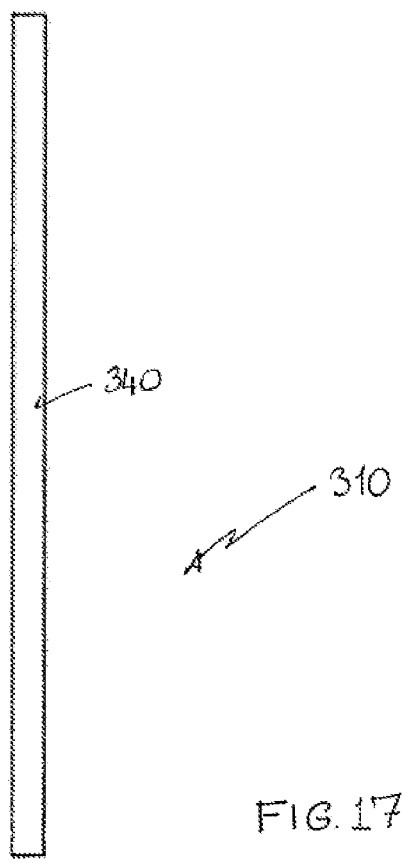
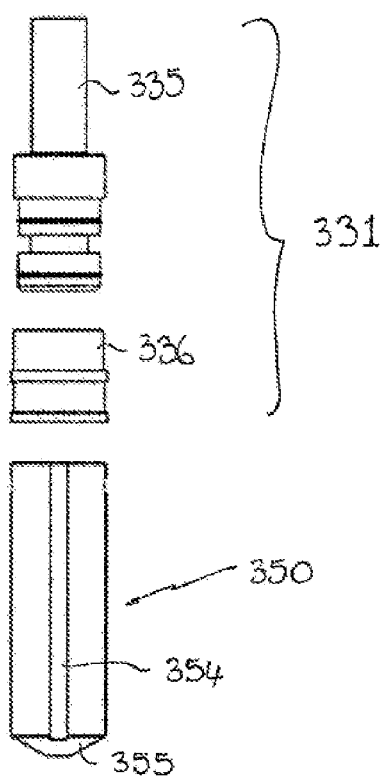
FIG. 17

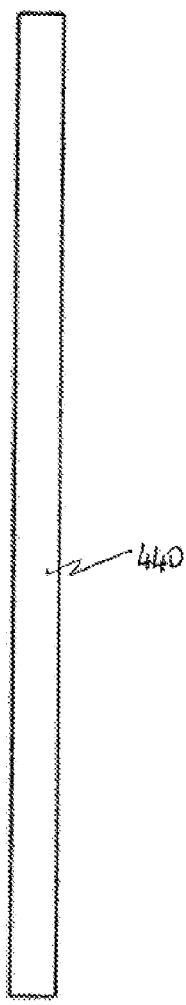
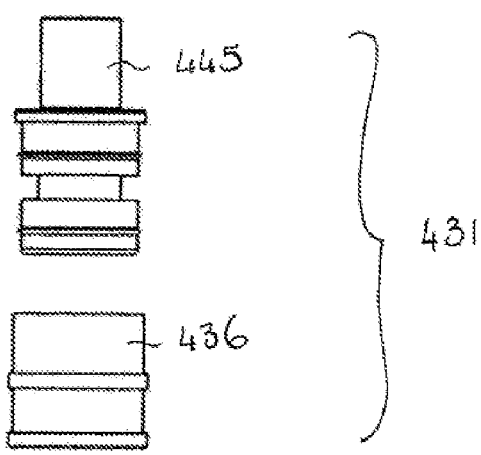
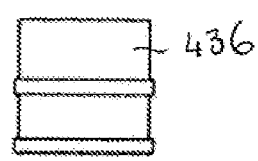
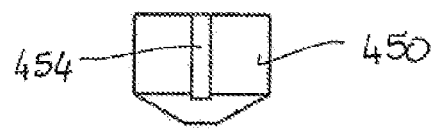
FIG. 18

LIQUID-LIQUID MIXING DEVICE SUITABLE FOR SAMPLE PREPARATION BY LIQUID-LIQUID EXTRACTION

This application is a National Stage Application of PCT/AU2018/050664, filed 28 Jun. 2018, which claims the benefit of Serial No. 2017902505, filed 28 Jun. 2017 in Australia, and which applications are incorporated herein by reference. To the extent appropriate, a claim of priority is made to each of the above-disclosed applications.

FIELD OF THE INVENTION

This invention relates generally to liquid-liquid mixing but has particular application to the field of sample preparation by liquid-liquid extraction (LLE).

BACKGROUND OF THE INVENTION

Liquid-liquid extraction (LLE) is one of the simplest and most widely used techniques for preparing samples for presentation to analytical instruments. It is particularly useful in separating target analytes from other components of complex matrixes and typically involves the transfer of analyte from an aqueous sample to a water immiscible solvent. However, the technique entails a number of known disadvantages, including consumption of large volumes of organic solvents, emulsion formation and, for some applications, a requirement for multiple extraction steps. Other issues include operator exposure to hazardous chemicals, operator errors and a procedure that is both time and labour intensive.

U.S. Pat. No. 4,454,231 discloses a technique in which mass transfer of a component between two initial liquid phases and physical separation of the two resultant phases are carried out in a single device. The device consists of a mixing reservoir that reciprocably slidably receives a mixer separator having a central vertical channel to a collection chamber. The two substantially immiscible liquid solutions are introduced into the mixing reservoir but thoroughly mixed by moving the mixer separator in and out of the mixing reservoir. After spontaneous separation of the two resultant phases, the upper phase is removed by pushing the mixing separator in so that the upper phase accumulates in the collecting chamber. A device that utilises the concept of this patent has been marketed as MIXXOR.

Recently, automated LLE systems have been developed but there is still significant room for improvement.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In accordance with a first aspect of the present invention, there is provided, a liquid-liquid mixing device including:
a barrel having a proximal end and a distal end defining an axis extending therebetween, the barrel having a liquid port for drawing and dispensing liquid from the barrel;
a plunger assembly including:
a seal member that is reciprocably moveable proximally and distally along said axis in sealingly slidable engagement with the internal wall of the barrel to define a variable volume chamber therein in communication with the liquid port, and
an agitator reciprocably moveable in the variable volume chamber; and
a mode selector mechanism for selection between two or more modes of operation for the plunger assembly, whereby on actuation of the plunger assembly, the agitator and the seal member move together, or the agitator is moveable relative to the seal member, depending on the selected mode.

The mode selector mechanism may includes at least one locking mechanism to facilitate adjustment between said two or more modes. Preferably, the plunger mechanism includes a stem and the stem is selectively movable relative to the seal member depending on the selected mode. The stem most preferably passes through the seal member.

Preferably the at least one locking mechanism is selectively operable to restrain the seal member against movement relative to the stem in a first mode. In this first mode, the plunger assembly is operable to aspirate or dispense liquid into or from the chamber by requiring the seal member to move with the stem.

Preferably the at least one locking mechanism is selectively operable to restrain the seal member against movement relative to the barrel in a second mode. This mode allows reciprocation of the agitator in the chamber while the seal member (movement of which would otherwise change the variable volume chamber) remains stationary. For this purpose, the barrel may include a flange portion and the at least one locking mechanism may be selectively operable to secure the seal member to the flange portion in the second mode. Preferably, the stem is attached to the agitator with the stem being reciprocably slidable relative to the seal member in the second mode.

The selection between modes allows the device to be multi-functional to draw in and dispense liquids from the barrel in a first mode, and also, in another mode, to mix liquids within the barrel.

The at least one locking mechanism preferably includes a locking member which is rotatable to select between said two or more modes. The locking member and the seal member are preferably joined for relative rotatable movement about said axis and constrained against separation along said axis. For this purpose, preferably the locking member and the seal member are joined by projections extending from one of the locking member and the seal member into a circumferential annular recess in the other of the locking member and the seal member.

In a most preferred form of the invention, the at least one locking mechanism includes a locking member which is rotatable to select between said two or more modes. The locking member may have an axial passage through which the stem passes and a radial slot from the passage. In this form, the stem and the barrel each include a projection rotationally offset from one another. Passage of each projection along the slot of the locking member as a result of movement of the plunger assembly is permitted alternately depending on the selected rotational orientation of the locking member.

Most preferably, the locking member comprises an elongate locking sleeve or locking collar which is rotatable about the stem. Preferably, the projection on the stem and the projection on the barrel are disposed at one quarter revolution from each other such that one quarter revolution of the locking member is required to change mode.

Furthermore, the locking member may have a peripheral recess extending in an arc to accommodate the projection of the barrel and restrain the locking member against movement along said axis relative to the barrel.

The agitator may include one or more end to end passages through which liquid in the chamber is forced as the agitator reciprocates in the chamber. Passages inside or around the agitator facilitate the syringe mixing function. Preferably, the end to end passages in the agitator comprise a plurality of longitudinal grooves in an external surface of the agitator. Alternatively, the end to end passages in the agitator comprise capillary bores or other passages through the body of the agitator. Alternatively, the agitator may take the form of a porous plate or a gap between the agitator and barrel.

Any of the features described below in connection with other aspects of the invention may have application to this aspect.

In accordance with another aspect of the present invention, there is provided a liquid-liquid mixing device including:
a barrel having a proximal end and distal end defining an axis extending therebetween, the barrel including a liquid port for drawing and dispensing liquid from the barrel;
a seal member in sealingly slidable engagement with the internal wall of the barrel, the seal member being reciprocably moveable proximally and distally along the barrel to define a variable volume chamber therein in communication with the liquid port;
an agitator reciprocably moveable proximally and distally in the variable volume chamber;
wherein the agitator is moveable independently from the seal member.

Any of the features described above or below in connection with other aspects of the invention may have application to this aspect.

In accordance with another aspect of the invention, there is provided, a liquid-liquid mixing device, comprising:
a barrel with a liquid port at or adjacent one end;
a plunger assembly that is reciprocably moveable in the barrel and includes:
    a seal member in sealingly slidable engagement with the internal wall of the barrel to define a variable volume chamber therein in communication with the liquid port, and
    an agitator plunger element reciprocably moveable in the variable volume chamber, which agitator includes one or more end to end passages through which liquid in the chamber is forced as the agitator plunger element reciprocates in the chamber; and
a drive mechanism for selectively (i) moving the seal member to aspirate or dispense liquid into or from the chamber, and (ii) reciprocating the agitator plunger element in the chamber to mix liquids therein.

In an embodiment, the drive mechanism includes:
a stem extending through the seal member and attached to the agitator plunger element; and
one or more locking devices for selectively locking the seal member with respect to (i) the stem, whereby the stem is operable to aspirate or dispense liquid into or from the chamber, or (ii) the barrel, whereby the stem is operable to reciprocate the agitator plunger element in the chamber to mix liquids therein.

It will be appreciated that when the seal member is locked with respect to the stem, controlled volumes of two immiscible liquids, and optionally a gas such as air, may be aspirated into the chamber. These liquids can then be mixed by rapidly reciprocating the agitator plunger element in the chamber in order to efficiently mix the two liquids. When the agitator plunger element is retracted and the liquids have spontaneously separated into two discrete phases, the stem can be operated to dispense the two phases separately in a controlled manner.

Advantageously, the liquid-liquid mixing device includes a valve for closing off or allowing liquid flow through the port. This valve may be provided at the port or otherwise.

The end to end passages in the agitator plunger element conveniently comprise a plurality of longitudinal grooves in the external surface of the agitator plunger element. Another option is capillary or other passages through the body of the agitator plunger element.

Preferably, the barrel is generally cylindrical in profile, and the agitator plunger element, seal member and stem are co-axially arranged with respect to the barrel.

In an embodiment, the one or more locking devices comprise a locking sleeve or collar that is longitudinally and axially substantially fixed with respect to the seal member but rotatable about the stem, a longitudinal slot and as arcuate slot in the sleeve, and respective pins on the stem and on a component fixed with respect to the barrel each arranged to engage the arcuate slot when locked to the seal member or the longitudinal slot when not so locked.

In another embodiment, the one or more locking devices may comprise respective pins for retractably engaging corresponding apertures in order to define the respective locking positions.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The invention will now be further described, by way of example only, with reference to the accompanying drawings, in which:

FIG. 2 shows different views of the seal member of the mixing device illustrated in FIG. 1;

FIGS. 3A and 3B are perspective and side elevational views of the agitator plunger element and attached stem;

FIG. 17 is an exploded view, similar to FIG. 6 of a further embodiment of a liquid-liquid mixing device shown without the barrel that is operated by two drivers from a PAL system; and FIG. 18 is an exploded view of yet another embodiment of a liquid-liquid mixing device, similar to FIG. 6 and shown without the barrel.

DETAILED DESCRIPTION OF EMBODIMENTS OF THE INVENTION

First Embodiment

Figure 1:
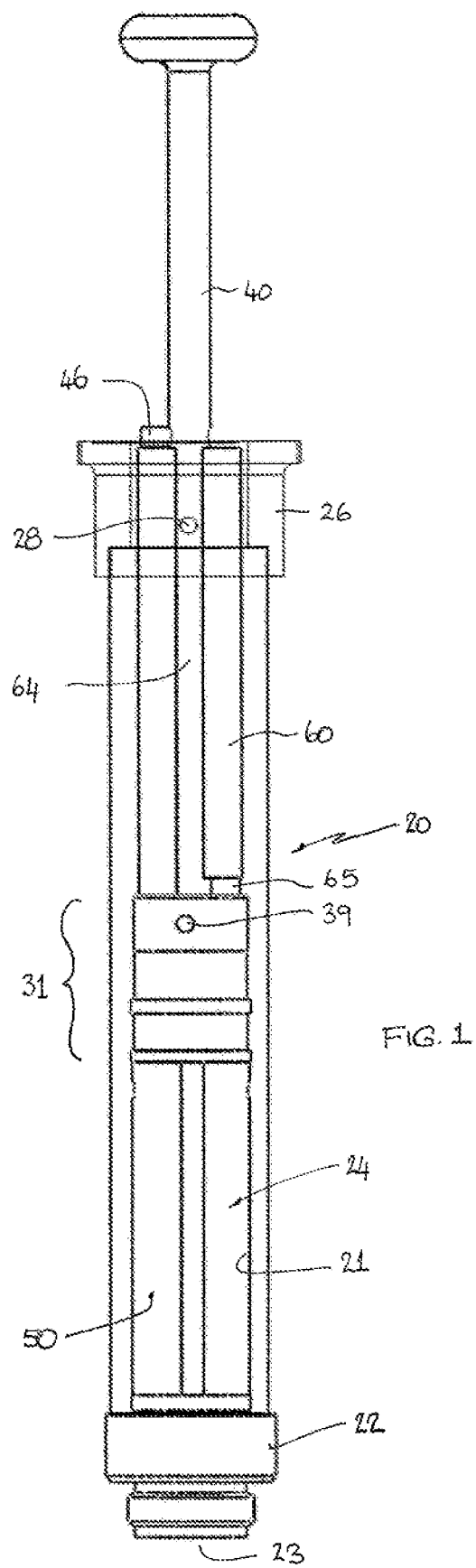
FIG. 1 is an axial cross-sectional view of a liquid-liquid mixing device.

A first embodiment of the liquid-liquid mixing device 10 is illustrated in FIGS. 1-8. The device 10 embodies a syringe-form mixing device with a barrel 20 and plunger stem 40 that both facilitates liquid-liquid extraction in a relatively safe manner and is adaptable to automated sample preparation.

In view of this configuration, the terms "distal" and "proximal" will be used. "Proximal" means at the end where the plunger stem 40 projects from the barrel 20 and "distal" means the opposite end. The illustrated device has been designed for 2 ml liquid-liquid extraction experiments, but a wide variety of other sizes may be provided.

The barrel 20 is in the form of a precision glass cylindrical barrel 20 with graduated measurement indicia (not shown). The barrel 20 is used for manually drawing up desired amounts of liquid. The barrel 20 is closed at its distal end by an end fitting 22 with a central liquid port 23. A control valve 25 (see FIG. 8) operable between an open and a closed configuration is provided at end fitting 22. Control valve 25 may optionally be incorporated in the end fitting 22. A syringe needle (not shown) is provided on the distal end of the end fitting 22. The proximal end of the barrel includes an end fitting guide flange 26.

Plunger Assembly

Figure 6:
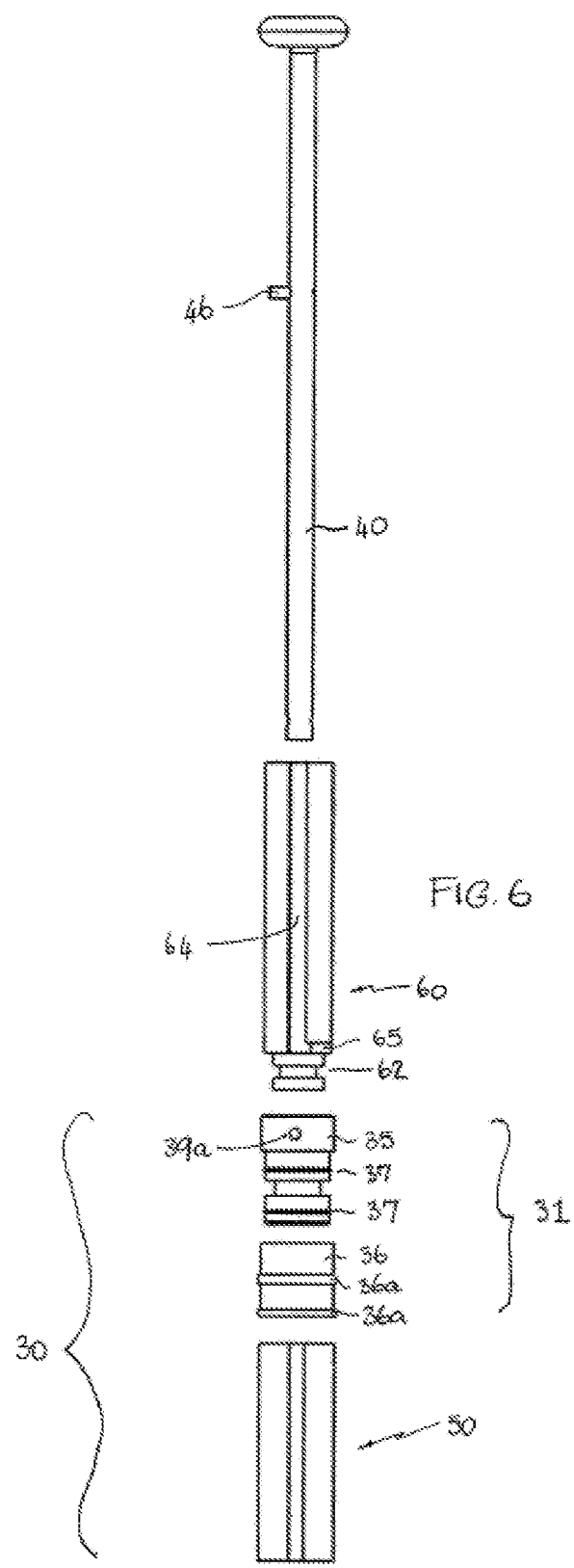
FIG. 6 is an exploded view of the mixing device of FIG. 1 shown without the barrel.
Figure 7:
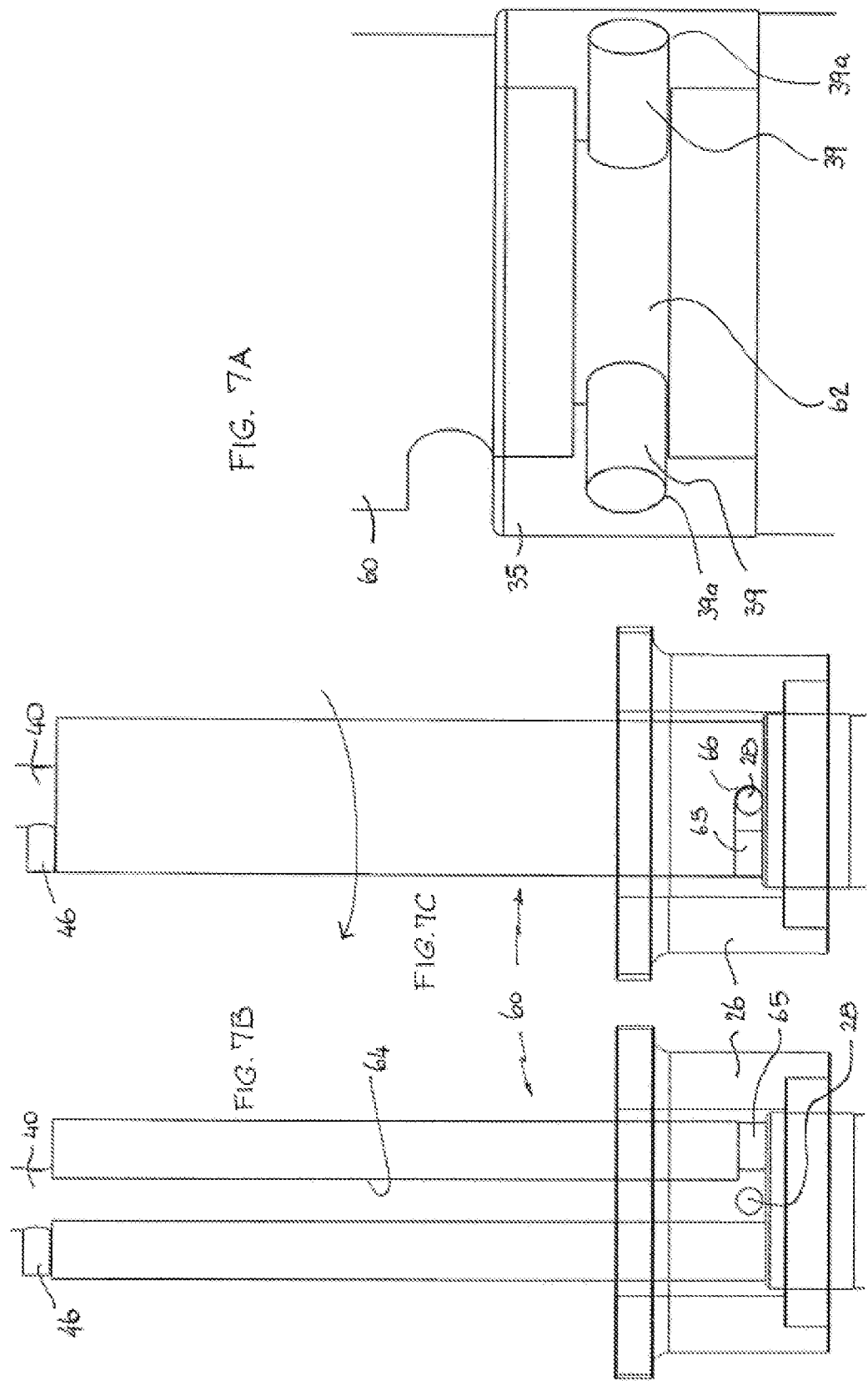
FIG. 7A is a detailed fragmentary view at the junction of the locking collar and the seal body.
FIGS. 7B and 7C are detailed fragmentary views illustrating the selective locking positions of the rotatable locking collar.

As best shown in the exploded view of FIG. 6, the barrel 20 accommodates a plunger assembly 30. Plunger assembly 30 includes a plunger seal member 31 and a generally cylindrical agitator/plunger element 50.

The plunger seal member 31 is sealingly slidable within the barrel in engagement with the internal wall 21 of the barrel to define a variable volume liquid chamber 24 in communication with the port 23. At the selection of the user, the agitator/plunger element 50 is either reciprocably moveable in chamber 24 or locked to the plunger seal member 31 to move with the plunger seal member. A mode selector mechanism is operable by the user to switch between modes.

The plunger assembly 30 also includes a plunger stem 40 coaxial with the central longitudinal axis of the barrel 20 defining a central longitudinal axis 41 of the mixing device 10.

The mode selector mechanism includes a locking collar 60. The plunger stem 40 co-axially slidably extends through the end fitting guide flange 26 at the proximal end of barrel 20. The locking collar 60 is connected to seal member 31 as will be explained. The locking collar 60 is also co-axial with and rotatable about stem 40 and central longitudinal axis 41. The stem 40 passes through a longitudinal bore in the locking collar 60.

Stem 40 extends through locking collar 60 and through a central bore 32 of seal member 31 (FIG. 2A) into variable volume chamber 24, where it is attached to agitator/plunger element 50 by engaging in a blind bore 51 at the proximal end of the solid body of the agitator/plunger element 50 as shown in FIG. 3B. Agitator/plunger element 50 has a neat but not necessarily sealing, sliding fit within barrel 20 and is formed with a pair of longitudinally extending channels, grooves or slots 54 in its outer cylindrical surface 56. A diametrically opposed pair of these grooves or slots 54 is illustrated in FIG. 3A but there may be more or fewer grooves or slots. The agitator/plunger element can also be of different sizes or different lengths thereby varying the volume of working solution within the variable volume chamber 24.

Figure 4B:
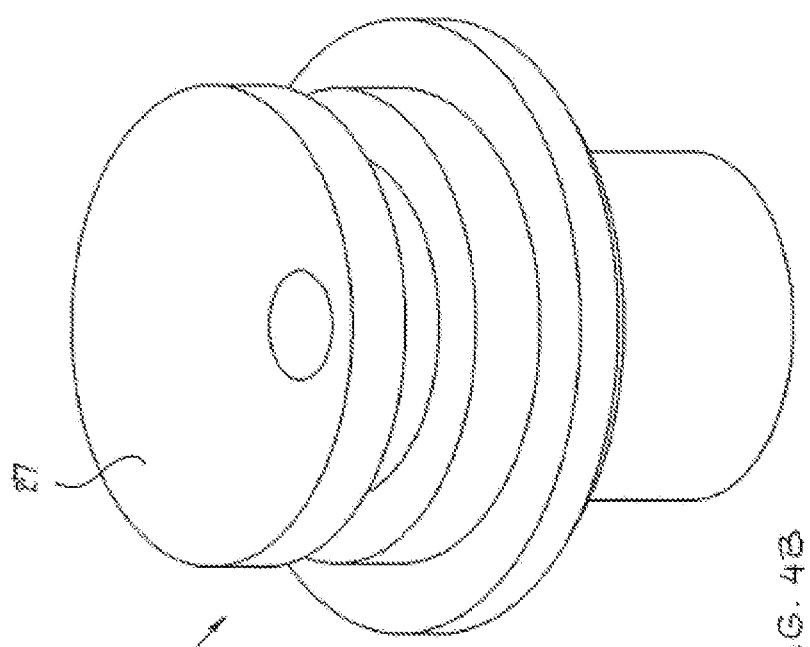
FIGS. 4A and 4B depict an alternative configuration of the agitator plunger element and a complementary barrel end fitting.
Figure 4A:
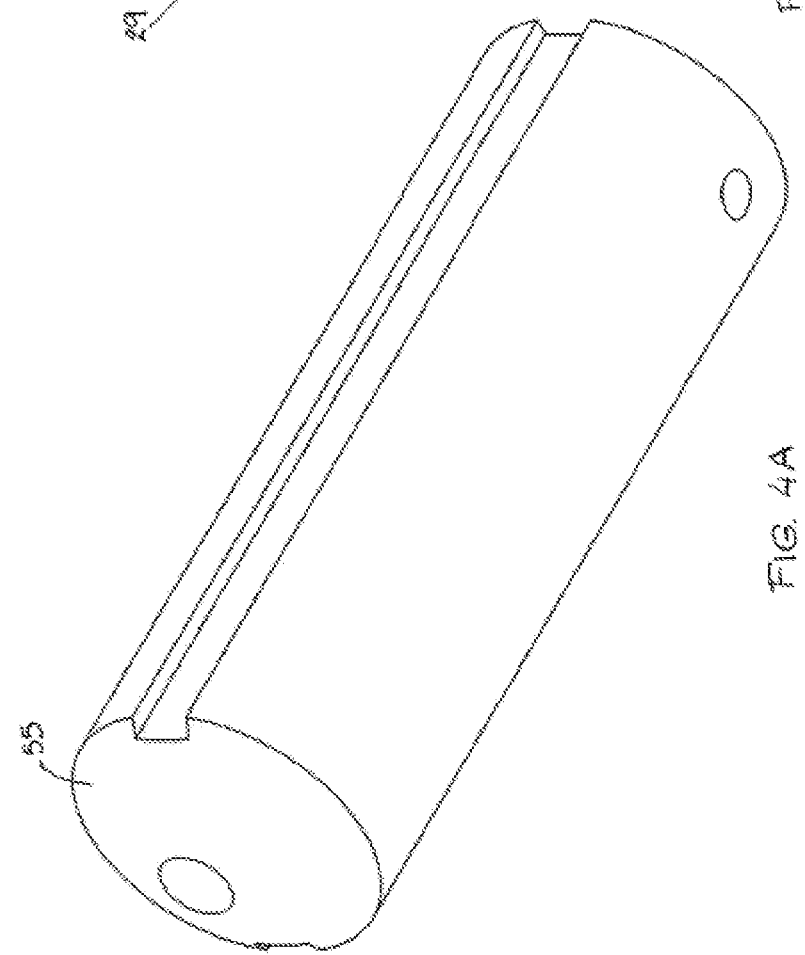

The front nose 55 of agitator plunger element 50 may be flat as per FIGS. 1 and 3. However as shown in FIG. 4A, the front nose 55 is preferably a shallow cone-shaped tip or dome-shaped. In this case, an optional insert component 29 of barrel end fitting 22 has a complementary convex seat 27 for the nose 55 as shown in FIG. 4B.

The detail of seal member 31 is shown in FIG. 2. It comprises a tubular metal seal body 35, the distal end of which mounts an external cylindrical sealing sleeve 36 of a suitable material such as PTFE having external sealing ribs 36*a*. Sleeve 36 is retained on the body 35 by circumferential annular barbs 37 on the seal body 35. The proximal end of the seal body 35 has a socket 38 that receives the distal end of the locking collar 60. The distal end of the seal body 35 has an internal annular recess to receive an O-ring (not shown) which provides sealing engagement with the stem 40.

As shown in FIGS. 2A and 7A, socket 38 is provided with three equi-angularly spaced radial through-holes 39*a* which receive radial pins 39. The distal end of locking collar 60 has a circumferential annular groove 62 on its outer surface which receives the pins 39. The pins 39 are retained within the holes 39A once the assembly is received in the barrel 20. The pins 39 allow the locking collar 60 to be longitudinally/axially fixed relative to the seal member 31 but rotatable relative thereto. Thus, the locking collar 60 is selectively permitted to rotate about the stem 40 and central longitudinal axis 41. See also FIG. 5 which shows the location of the circumferential annular groove 62 on the distal end of the locking collar 60.

Depending on the selected orientation of the locking collar relative to the stem, the locking collar 60 will either lock the seal member 31 to the stem 40 for movement therewith or will lock the seal member 31 to the barrel 20 permitting independent movement of the stem 40. When the seal member 31 is locked to the stem, the seal member 31 will move with the stem and the agitator/plunger element 50 to function in aspirating fluid into the chamber 24 or dispensing fluid from the chamber 24. When the seal member 31 is locked to the barrel 20, the stem 40 and the agitator/plunger element 50 can move independently from the seal member 31 and function to agitate and/or mix the contents of the chamber 24. The components that facilitate mode selection will now be explained.

Mode Selector Mechanism

Figure 5:
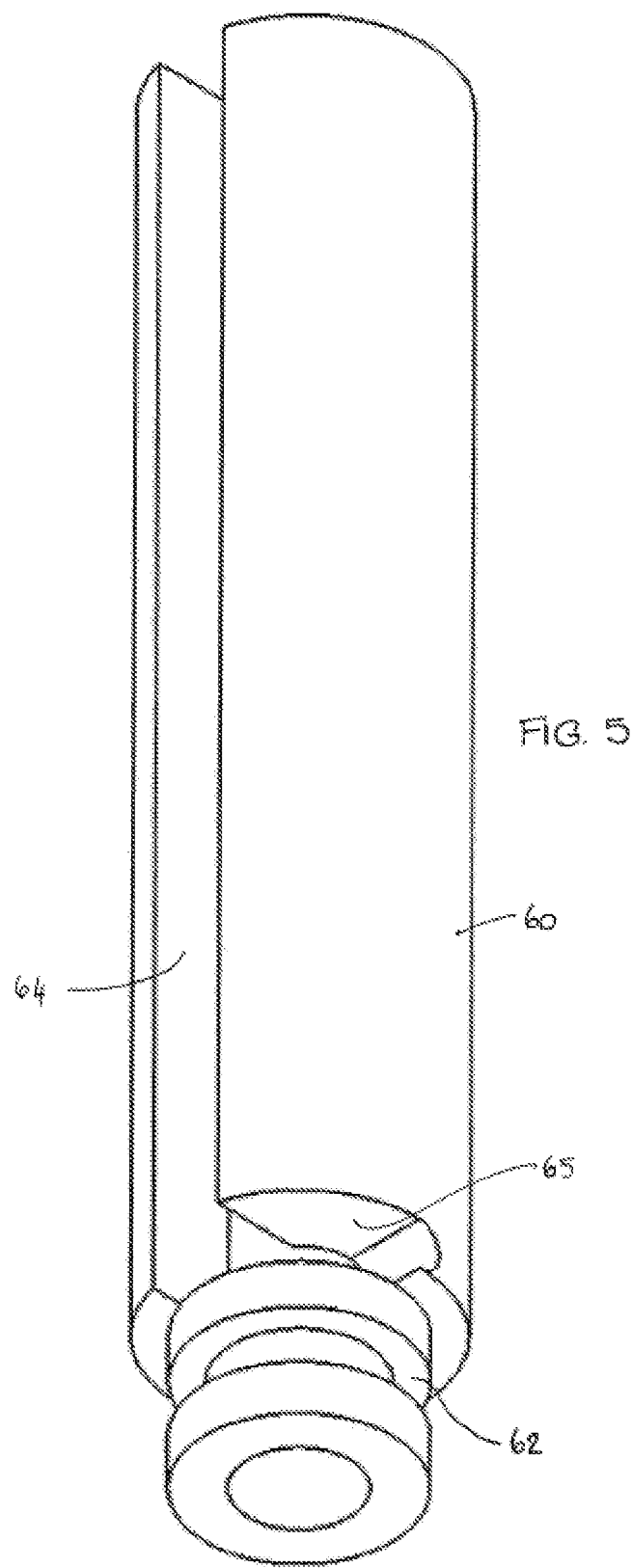
FIG. 5 depicts the locking collar.

As shown in FIGS. 5 and 6, the locking collar 60 is longitudinally divided by a slot 64 (collar slot 64) extending radially from the central longitudinal bore. At its distal end, adjacent the seal body 35, the locking collar 60 also has an external recess, groove or slot 65 (collar recess 65) extending along an arc in the external periphery of the locking collar 60. The collar recess 65 extends for approximately a quarter of the circumference of the locking collar 60 and has a seat 66 at the end of the collar recess opposite the collar slot 64. The collar recess 65 is open and connected to the collar slot 64.

Mode of Operation

Figure 8:
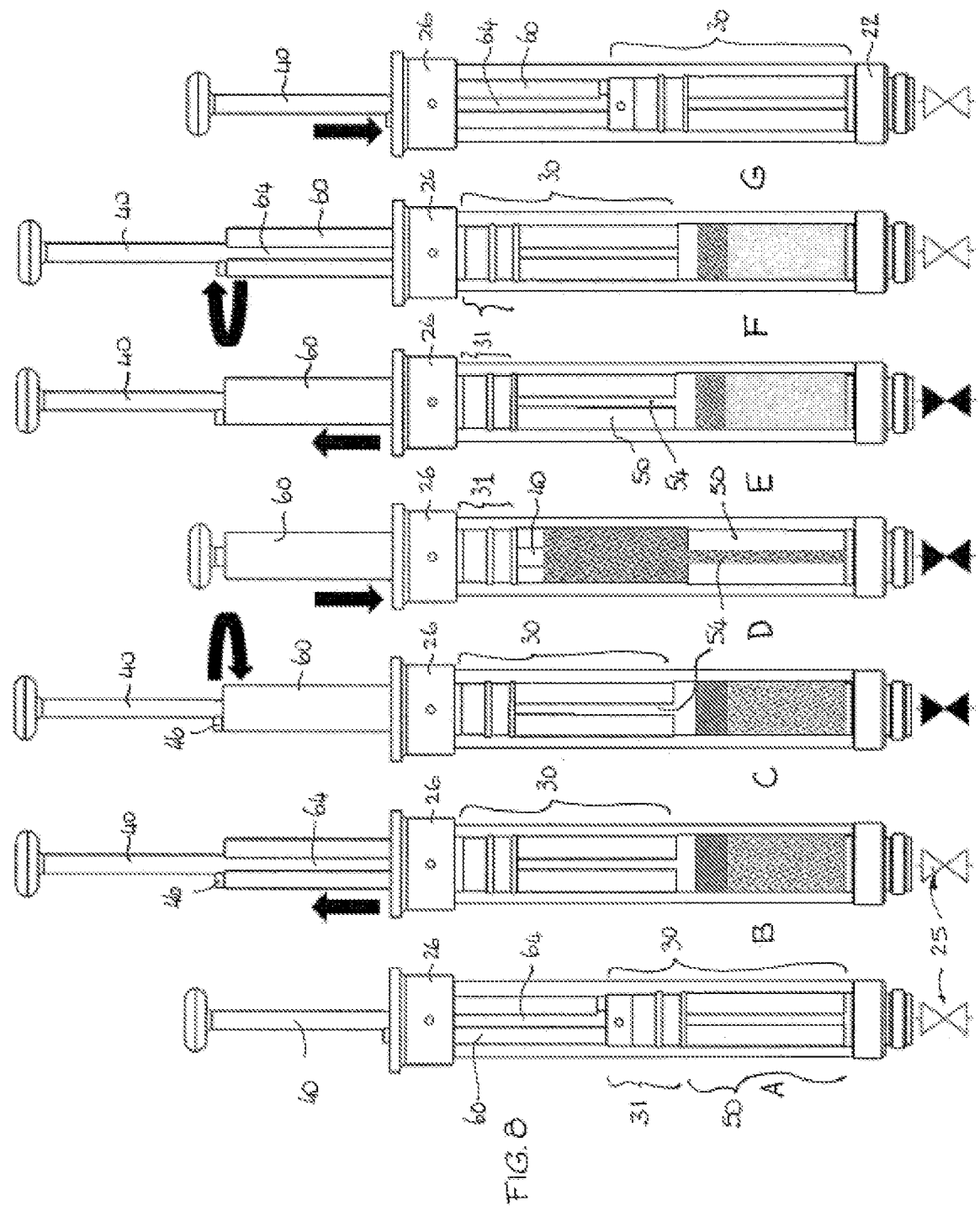
FIGS. 8A to 8G are a set of diagrams illustrating the successive steps in carrying out a liquid-liquid extraction operation using the liquid-liquid mixing device of FIG. 1.

The steps in employing the mixing device 10 for a liquid-liquid extraction (LLE) operation are illustrated diagrammatically in FIG. 8.

As shown in FIG. 1, end fitting guide flange 26 of barrel 20 has a radially inwardly directed pin 28 (flange pin 28). The stem has a radially outwardly extending pin 46 (stem pin 46). The flange pin 28 and the stem pin 46 are rotationally offset and configured to project radially from the stem at one quarter rotation or 90 degrees apart as is visible in FIGS. 7B and 7C. The stem may be retained in its rotationally offset orientation by being fixed to an instrument driver as discussed in the examples below.

When the stem 40 is withdrawn proximally as depicted in FIGS. 8A and 8B, the agitator/plunger 50 bears against the distal end of the seal member 31 so that the agitator/plunger 50, seal member 31 and the locking collar 60 will be moved proximally. The alignment of the flange pin 28 within the collar slot 64 permits this relative movement between the collar 60 and the flange 26. FIG. 8B shows the top of the aspirating stroke. During this aspirating stroke, fluid may be drawn into the chamber 24 through needle and open valve 25.

Similarly, in FIG. 8F during the dispensing stroke, the flange pin 28 is directed into the collar slot 64, while the stem pin 46 bears against the top of the locking collar. Thus, when the stem is pushed distally, the pin 46 will push the locking collar 60 distally while the flange pin 28, aligned with the collar slot 64 will permit the locking collar 60 to slide distally relative to the flange 26 and barrel 20. During the dispensing stroke with valve 25 open, the locking collar 60, seal member 31 and the agitator/plunger 50 will move in unison to dispense the contents of the chamber 24 until the position of FIG. 8G is reached where the agitator/plunger 50 bears against the distal end of the chamber 24 or end fitting 22.

However, when the locking collar is rotated clockwise by 90 degrees as illustrated in FIG. 8C, the collar slot 64 will therefore be rotated by 90 degrees and will thus align with the stem pin 46. At the same time, the rotation of the collar 60 will mean that the flange pin 28 is no longer seated in the collar slot 64 but instead is seated in the seat 66 of the collar recess 65. This is illustrated in greater clarity in FIGS. 7B and 7C. Thus, when the stem 40 is moved distally as per FIG. 8D, the engagement of the flange pin 28 in the collar recess 65 will prevent relative sliding movement of the collar 60 and the flange 26. Instead, the stem 40 will slide relative to the collar 60 given that the stem pin 46 is now aligned with the collar slot 64. In this configuration, the stem can be moved distally and proximally to move the agitator/plunger 50 to mix or agitate the contents of the chamber 24. This results in agitation, turbulence, mixing and ultimately mass transfer along the channels 54.

Sequence of Operation

In the initial start position (FIG. 8A), the plunger assembly 30 (comprising the seal member 31 and the agitator/plunger element 50) is fully inserted into the barrel 20 and the mixing device 10 is ready to aspirate as a syringe. With the valve 25 open, predetermined volumes of immiscible liquid, sample and solvent and air are aspirated accurately into chamber 24 (FIG. 8B). Collar 60 is then rotated clockwise when viewed from the proximal end (FIG. 8C) to lock the collar 60 and the seal member 31 to the end fitting guide flange 26 and the agitator plunger element 50 is reciprocated up and down by stem 40 (FIG. 8D). With the valve 25 closed, the liquids are forced back and forth through channels 54 to effect mixing in chamber 24 of the immiscible liquids and mass transfer of the component of interest. With the plunger stem 40 at its outermost position (FIG. 8E) and after spontaneous separation of the two resultant phases, locking collar 60 is rotated back (counterclockwise) to lock the seal member 31 and locking member 60 to the stem (FIG. 8F). The valve 25 is opened and the plunger assembly 30 is pushed in by the stem 40 for dispensing and collection of the two separated phases.

Dispensing of each phase e.g. aqueous and organic, may be done separately. Typically, the amount of each phase will be known because the amounts of the liquid solutions introduced into the chamber 24 are known. Optionally, where an emulsion has formed between the two liquids, e.g. water and oil, then 3 separate collections may be made, firstly of the water, secondly of the emulsion (transition phase) and thirdly of the recovered oil phase containing the target analytes.

Second Embodiment

Figure 9:
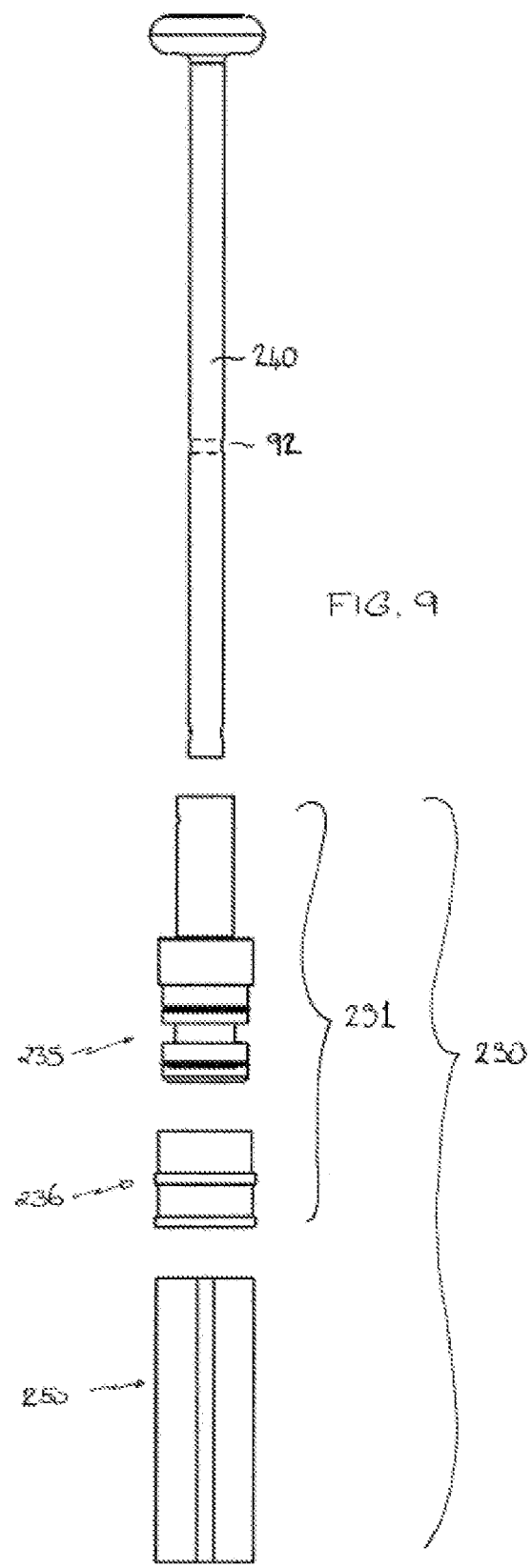
FIG. 9 is an exploded view, similar to FIG. 6 and without the barrel, of another embodiment of a liquid-liquid mixing device that utilises retractable locking pins rather than a locking collar.
Figure 10:
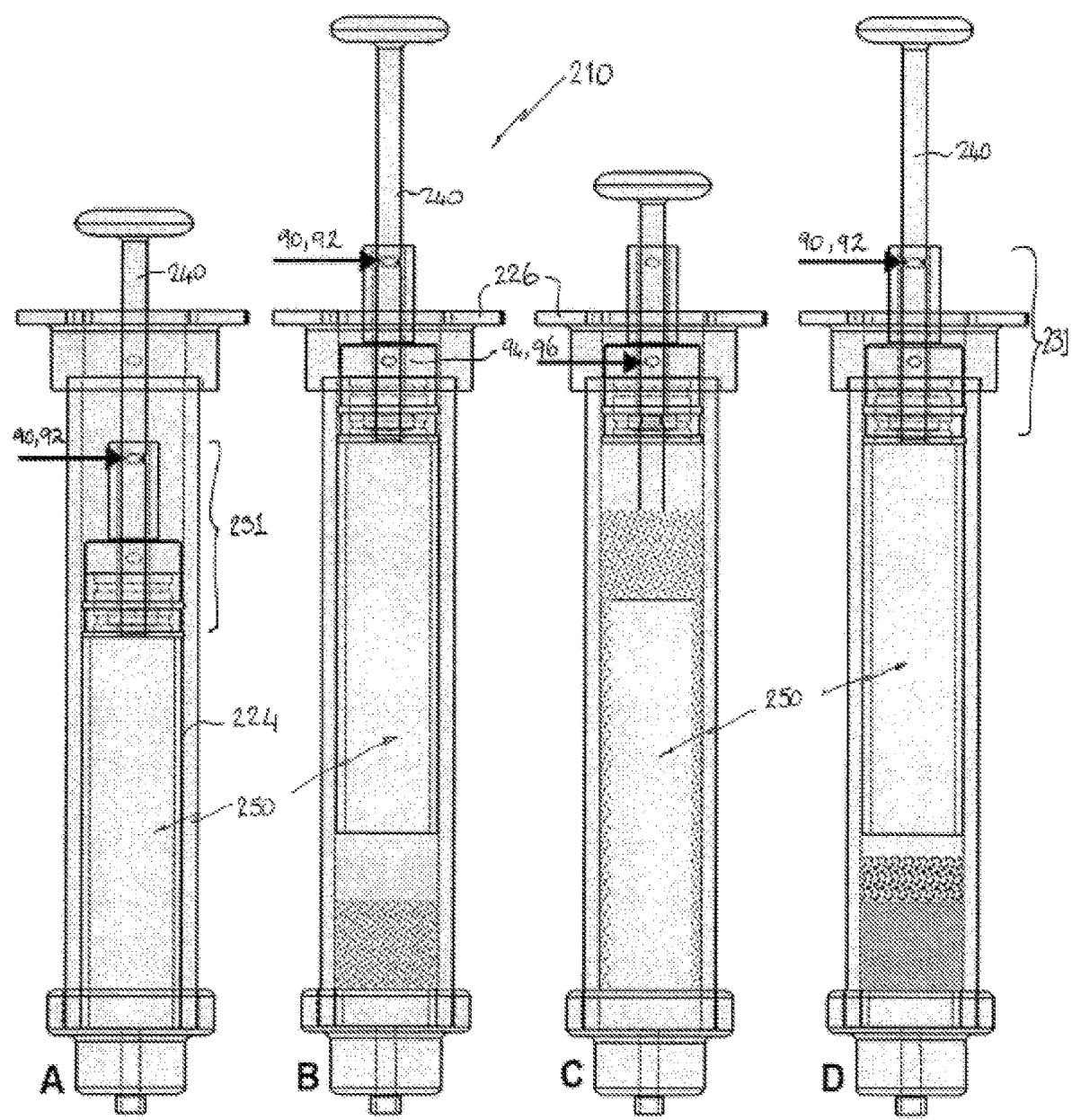
FIG. 10 is a view similar to FIG. 8 for the embodiment of FIG. 9.

A second alternative embodiment of the liquid-liquid syringe mixing device 210 is illustrated in FIGS. 9 and 10. In the second embodiment, like reference numerals are preceded by a "2" are used to denote like parts to the first embodiment. The device 210 omits the locking collar of the first embodiments. Instead, the locking mechanism is a simple arrangement of pin holes 92, 96 and associated extendible and retractable pins 90, 94. Each pin 90, 94 may be selectively engageable with a respective hole 92, 96.

With reference to FIG. 10, at the end of the previous dispensing stroke, the stem 240 is withdrawn from the barrel 220 (FIG. 10D) and the seal member 231 is locked to the stem 240 atop the agitator/plunger element 250 by a pin 90 engaging aligned holes 92 in the stem and the proximal end of the seal member 231. In this configuration (FIG. 10A), the device 210 is ready for the aspiration step which involves moving the stem 240, seal member 231 and the agitator/plunger element 250 distally and then withdrawing the assembly to aspirate liquids into the chamber 224 as shown in FIG. 10B.

Then, as shown in FIG. 10B, when the stem reaches the top of the aspiration stroke, the valve (not shown) is closed and the seal member 231 is locked to the end fitting guide flange 226 with a separate flange pin 94 engaging aligned holes 96 in the end fitting guide flange 226 and the seal member 231. The previously mentioned pin 90 securing the seal member to the stem is removed and the agitator/plunger element 250 is thereby released from its engagement with the seal member 231 in order to move up and down for mixing as shown in FIG. 10C.

To dispense the respective phases, the stem 240 is withdrawn as per FIG. 10D and the seal member 231 is again held to the stem 240 and agitator plunger element 250 by the first mentioned pin 90. The flange pin 94 is released and the valve opened to dispense the contents.

The particular features and benefits of the syringe devices 10, 210 illustrated in FIGS. 1-10 include one or more the following:

Smaller footprint compared to separation funnels by transferring all the steps of routine/standard LLE procedure into a single device.

Automation—To adopt LLE syringe onto an autosamplet platform such as CTC or Tecan.

Syringe can be controlled digitally via stem 40, 240 for aspirating, mixing and allocating the solutions—controlled mixing through time and number of strokes.

Precision and accuracy in the volumes aspirated and dispensed.

Reduced volumes of organic solvents.

Reduced volumes of valuable samples.

The syringe embodiment is easily translated into a volumetric range.

Reduced emulsion formation because of controlled mixing and agitation.

Controlled environment—the enclosed nature of the syringe minimises sample contamination.

Controlled environment—the enclosed nature of the syringe increases operator safety.

Improved sensitivity—by easily aspirating small volumes of solvent, a much higher analyte concentration is achieved through the great reduction of the solvent to sample volume ratio.

Reduced time—High throughput extractions.

Washing—Mixing and agitation of aspirated cleaning liquid such as water inside the barrel is sufficient to wash the syringe and make the device ready for furthur extractions.

Exemplary and Comparative Liquid-Liquid Extractions

To demonstrate the functionality of the liquid to liquid extraction (LLE) device, manual caffeine extraction from water, automated dichloroethane extraction from water and automated extraction of fatty acid methyl esters (FAME) from dry blood spots were performed. For dichloroethane extraction from water and FAME extraction from dry blood spots the LLE syringe device was mounted on a programmed Cavro pump (not shown) to control aspiration, mixing and dispensing steps.

Caffeine Extraction:

Sample was prepared by dissolving a teabag in hot water (200 ml), diluted in water (1:25) and filtered (0.45). MEPS syringe and MIXXOR as two other extraction methods were used to compare and validate the extraction results of LLE syringe device.

Methods:

MEPS (solid phase extraction): the bed was activated with 50 μl methanol (3 times), methanol was washed off with 50 μl water (3 times), 100 μl of sample was aspirated into the MEPS syringe (3 times—caffeine is captured by bed), eluted with 100 μl methanol (1 time), and finally 1 μl of solvent was injected into GC/MS.

MIXXOR: Mixxor is a device invented for mass transfer between two liquid phases for manual liquid-liquid extraction. An early form is the subject of the aforementioned U.S. Pat. No. 4,454,231. It has a mixing-separator component fitted tightly in a mixing-reservoir part. The mixing-separator with capillary along a tube ends in a collecting container. The mixing-reservoir is filled with a mixture of an aqueous solution containing a solute (soluble in some organic solvent and not miscible with water) and a suitable organic solvent (not miscible with water). By moving the mixing-separator in and out through the mixing-reservoir the two phases are thoroughly mixed. Vacuum in the mixing-reservoir and the pressure in the collecting container cause an excellent mixing and mass transfer. At the end of the mixing procedure, upper phase and lower phase of liquids are formed. The mixing-separator is allowed to remain in the upper position, then the cap is open to release air pressure and finally the upper and lower phases are separated and collected from mixing-reservoir or collecting reservoir. For caffeine extraction from water, 1.5 ml sample was put in the mixing-reservoir tube, 0.5 ml DCM was added, the capillary tube was put inside the mixing-reservoir and the cap was closed. The capillary tube was moved up and down 10 times. After separation of two phases, the lower phase (solvent) was collected and 1 μl of solvent was injected into GC/MS.

LLE SYRINGE DEVICE: Using the device of FIGS. 1 to 7 and the procedure of FIG. 8, the valve 25 was opened and 1.5 ml sample and 0.5 ml solvent (DCM) were aspirated into the syringe barrel 20. Then the valve 25 was closed and the plunger stem 40 was pulled up and the seal-locking device 31, 60 was held against the flange 26. The agitator/plunger element 50 was moved up and down for mixing. Then the seal-locking device 31, 60 was released from the flange 26, the valve 25 was opened and lower phase (solvent) was collected easily and injected into GC/MS (1 μl).

Experiments were also carried out manually with the pin-hole holding mechanism of the syringe device 210 of FIGS. 9 and 10. When the seal-locking device 231 with a plunger-seal member was held on top of the agitator/plunger element 350 by a stem-pin 90, 1.5 ml of sample and 0.5 ml solvent (DCM) and air were aspirated into the syringe barrel 220. Then, when the valve was closed, the plunger stem 240 was pulled up and the seal-locking device 231 was held against the flange 226 with a flange-pin 94. The stem-pin 90 on the seal-locking device 231 was released and the agitator/plunger element 250 was moved up and down for mixing. After 15 mixing strokes (40 beats per minute), the flange-pin 94 holding the seal-locking device 231 on top of the agitator plunger element 250 was released and the stem pin 90 re-engaged. The valve was opened and lower phase (solvent) was collected and injected into GC/MS (1 μl).

Figure 11:
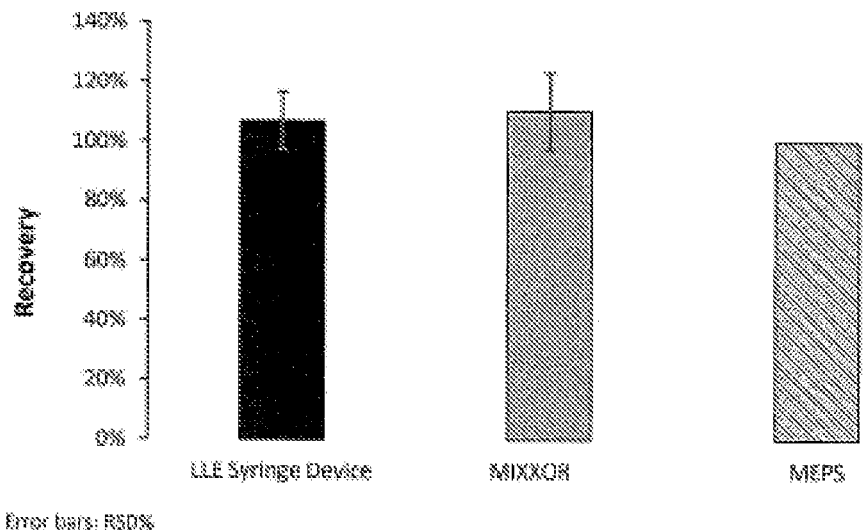
FIG. 11 Illustrates the results of caffeine recovery for 3 different extraction methods.

Results:

FIG. 11 compares the caffeine extraction results for LLE syringe device and MIXXOR with MEPS. The results show excellent extraction recovery. Although it has been tried to do the mixing at a uniform speed, the errors are due to the manual handling and not having good control on the speed while mixing.

Figure 12:
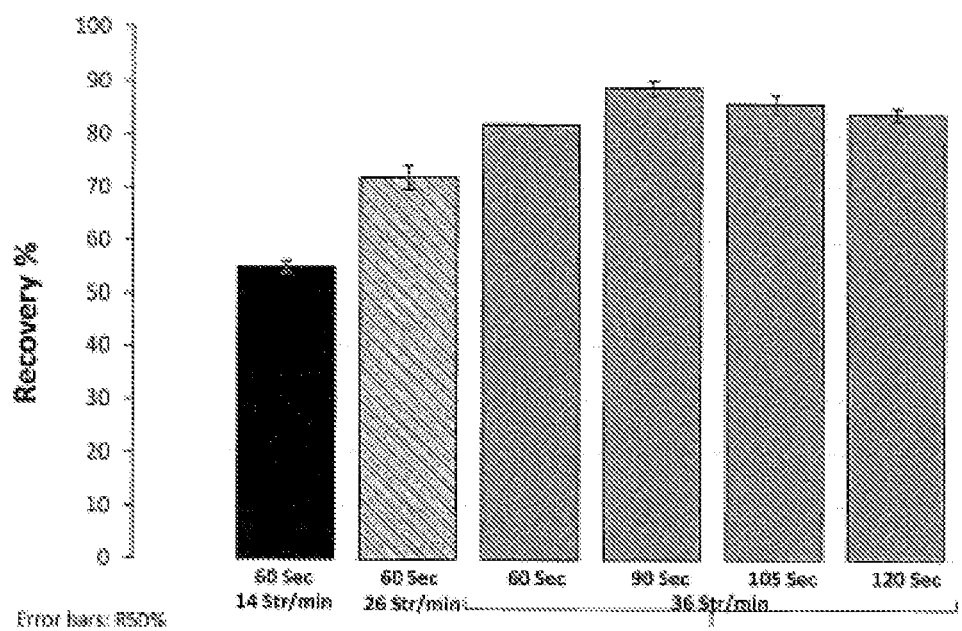
FIG. 12 illustrates Dichloroetheme extraction recovery for different mixing speeds and duration.
Figure 13:
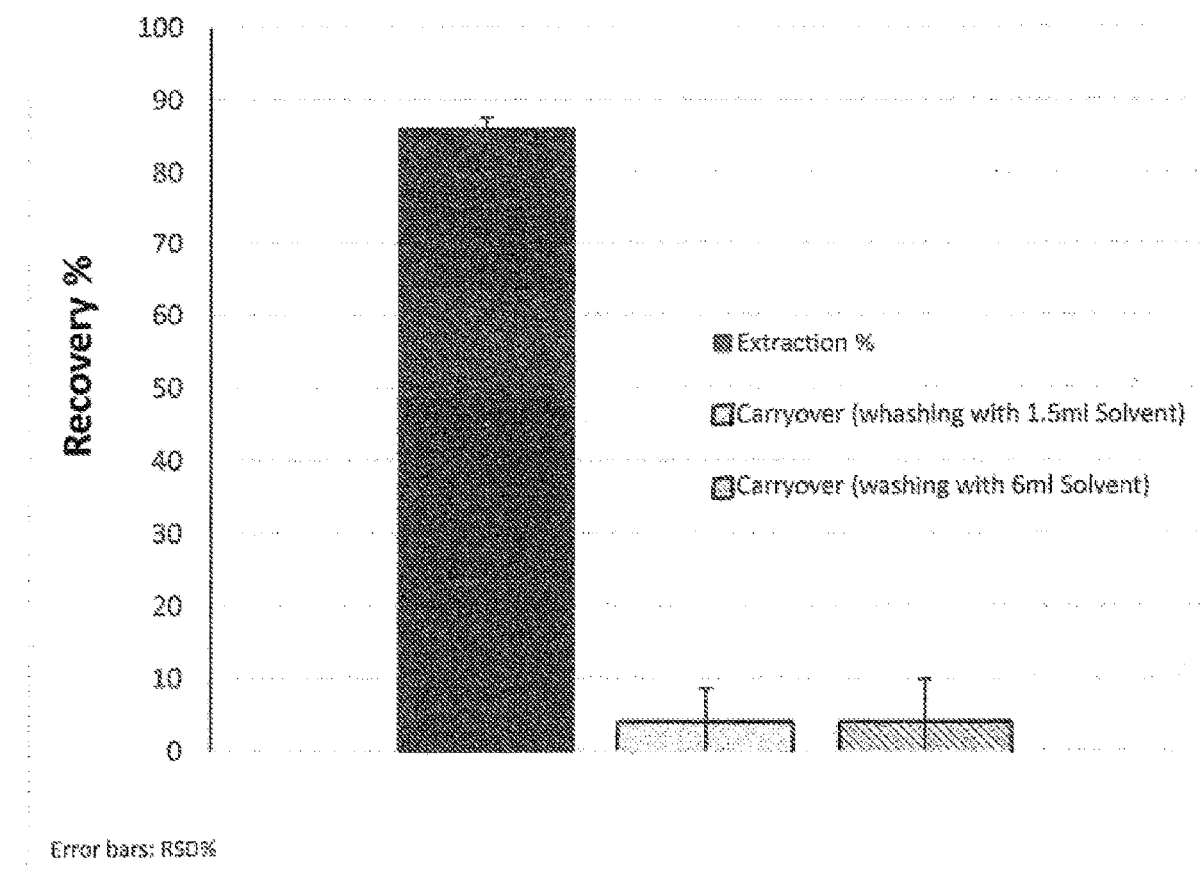
FIG. 13 illustrates carry over in the device of FIG. 1 with 2 different washing methods.

Dichloroethane Extraction:

The LLE syringe device 10 of FIGS. 1 to 7 was mounted on a Cavro pump (not shown) which was programmed to carry out automated LLE experiments. The pump was set to aspirate 1.5 ml of sample (10 ppm dichloroethane in water) and 0.5 ml of solvent (Hexane). Aspirating was done without priming the syringe device 10. Three syringes were assembled and experiments were repeated three times. Three different pump speeds (14, 26 and 36-highest speed of the pump) were tested to investigate the effect of speed of mixing and turbulence on mass transfer and extraction recovery. FIG. 12 shows that the extraction recovery increases by increasing the pump speed. For the speed of 36 strokes per minute, the mixing and extraction time was increased to examine the effect of time on the recovery. FIG. 12 demonstrates that the extraction recovery has been improved by increasing the time from 60 s to 90 s. After that there is a plateau or a slight decrease because of the emulsion formation due to mixing.

Figure 16:
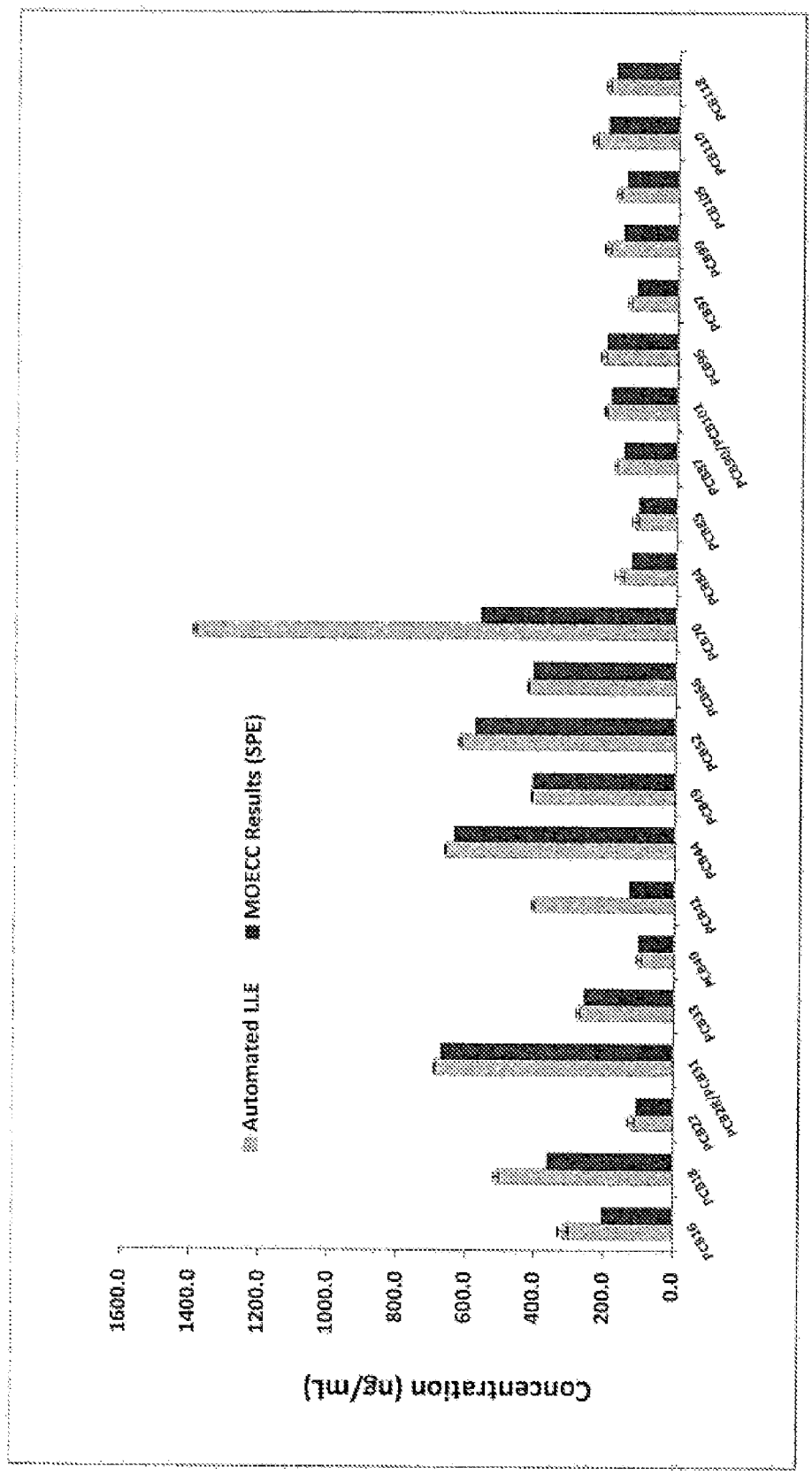
FIG. 16 validates the results for automated LLE compared to an accredited method (MOECC) for a CALA water sample.

To examine the carry over inside the LLE syringe device two washing programs were examined. In the first program 1.5 ml of hexane was aspirated into the syringe, the barrel was washed completely with the turbulence and agitation of the mixing step (10 strokes at speed of 36 strokes per minute) and then the solvent was discarded. After three times washing (6 ml hexane), the extraction experiments were carried out with pure water (1.5 ml) and hexane (0.5 ml) to inspect the carry over inside the device. In the second program 0.5 ml of hexane was aspirated into the syringe, the barrel was washed thoroughly with 10 strokes (36 strokes per min), the solvent was discarded and the washing step was repeated two more times (1.5 ml hexane). FIG. 16 shows that the mixing and agitation inside the barrel is sufficient to wash the device even with the total volume of 1.5 ml solvent. The proper washing procedure makes the syringe ready for further extraction experiments.

Figure 14:
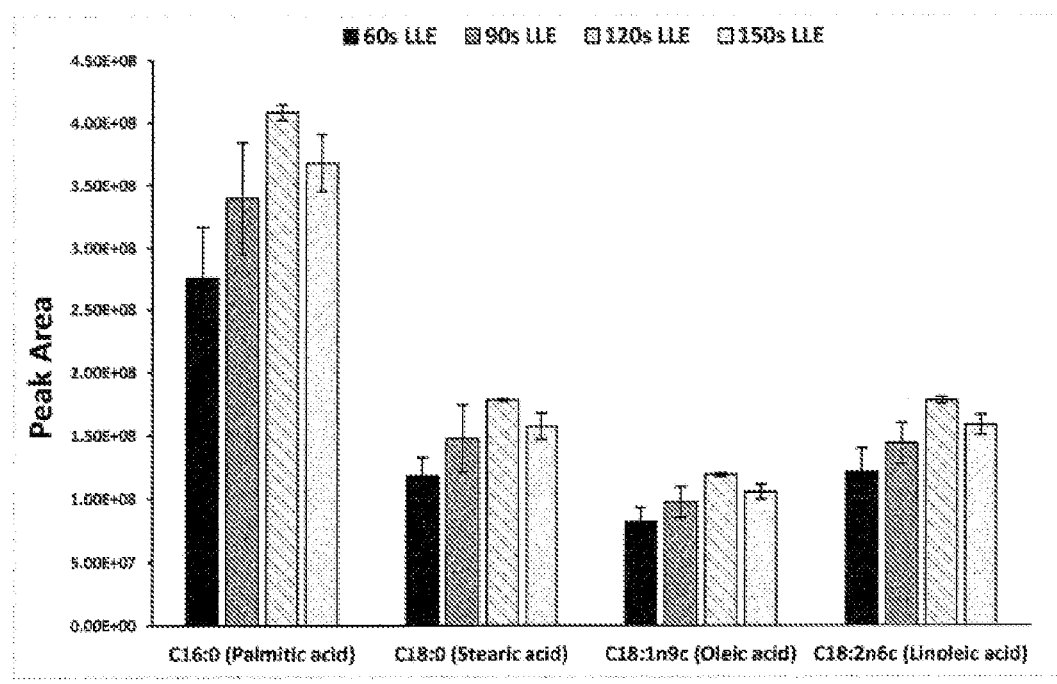
FIG. 14 illustrates peak areas of extracted fatty acids for different extraction times.
Figure 14:
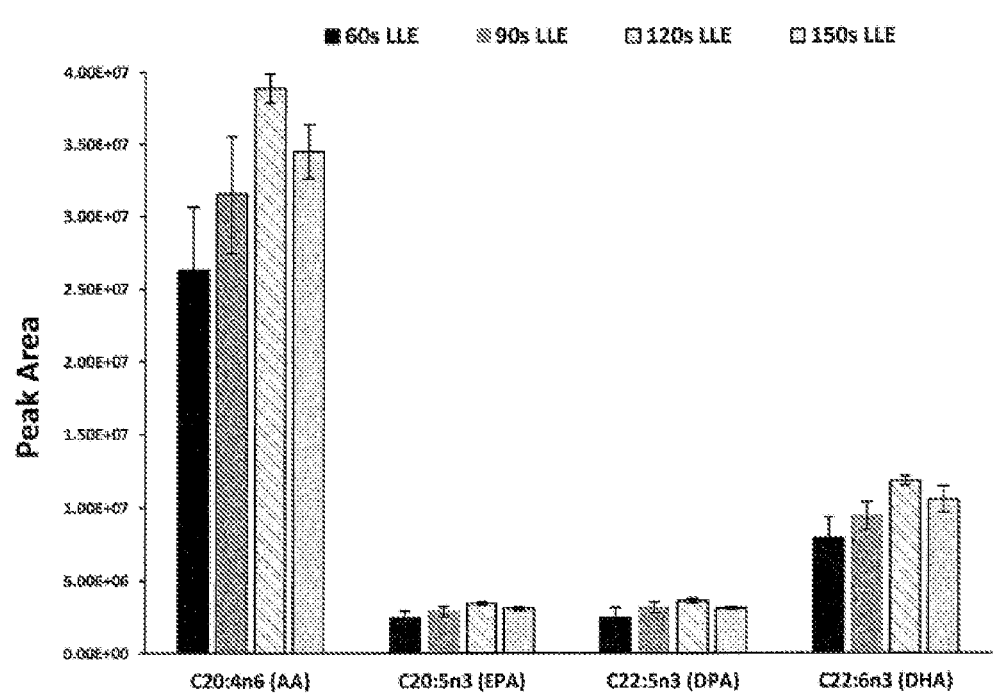

FAME Extraction:

We have demonstrated FAME extraction as a demanding application by using the LLE syringe device 10 of FIGS. 1 to 7, mounted on a Cavro pump (not shown). To prepare the sample, 10 μL blood spot on PUFAcoat which was stored in fridge for 3 hours, was put in a solution of 2 mL 1% H2SO4 in methanol. Then it was placed at 75° C. temperature for 2 hours. 1.2 mL of the sample, 150 μL water and 450 μL heptane were aspirated into the syringe and mixed for 60 s, 90 s, 120 s and 150 s with 36 strokes/min. Solutions were allowed to sit for 1 min after which two phases were separated completely. The bottom layer (the aqueous phase) was disposed of and the upper layer (solvent) was collected for GC analysis. In order to compare the fatty acids composition extracted using automated and manual liquid-liquid extraction (LLE) methods, all the above solutions were shaken inside a vial vigorously for 60, 90, 120 and 150 sec. Then solutions were allowed to rest for 1 min and, finally, the heptane layer was collected and proceeded to GC analysis. FIGS. 14 (A, B) show the peak areas of eight extracted fatty acids for different extraction times. These figures demonstrate that the highest peak area for all the fatty acids is associated with the 2 min extraction.

Figure 15:
FIG. 15A illustrates the percentage of saturated fatty acids, monounsaturated fatty acids and polyunsaturated fatty acids.
FIG. 15B illustrates the ratio of n6/n3 and AA/EPA as indicator for disease risk.
Figure 15:
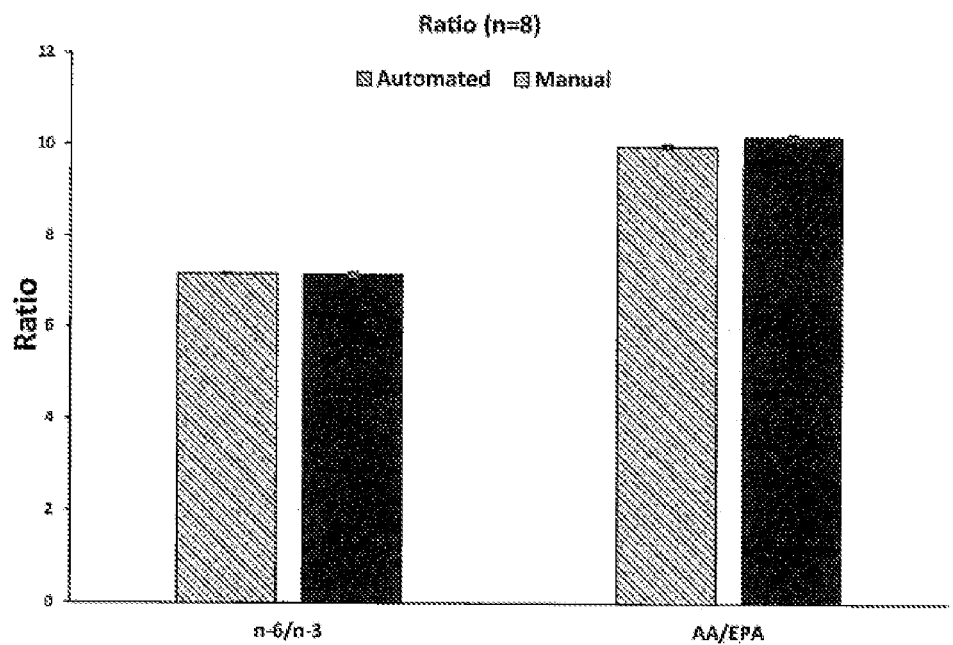

FIG. 15 (A) shows the percentage of saturated fatty acids (SFA), monounsaturated fatty acids (MUFA) and polyunsaturated fatty acids (PUFA), with the similar results for manual and automated LLE.

FIG. 15 (B) shows the ratio of n6/n3 and AA/EPA as indicators for disease risk. The indicator ratios for both automated and manual approaches are comparable. The results prove the functionality of the LLE syringe device for automated FAME extractions.

Third Embodiment

FIG. 17 is a third alternative embodiment of the liquid-liquid syringe mixing device 310. In the third embodiment, like reference numerals are used as per the first embodiment, except that these reference numerals are preceded by a "3" to denote like parts to the first embodiment. The FIG. 17 embodiment illustrates a conical or frustoconical nose 355 at the distal end of the agitator 350. The mixing device 310 is assembled by inserting the stem 340 through the central bore of the seal member 331 and into the blind bore (not shown) at the proximal end of the agitator 350 where the distal end of the stem 340 is secured through a pin connection.

This embodiment of the mixing device 310 does not include a mode selector mechanism. The mixing device 310 is mounted for automated operation on a PAL system (not shown) which is an automated sample preparation and handling platform. The PAL system has a primary driver and a secondary driver. The primary driver is used to drive the seal member 331. The secondary driver is used to drive the agitator 350. Thus, the primary driver is used for aspirating and dispensing. As the primary driver moves distally in the barrel, the agitator 350 will also be moved distally. As mentioned in previous embodiments, there is an O-ring within the central bore of the body 335 intended to prevent egress of liquid upwardly through the central bore of the seal member 331. The O-ring creates a seal between the internal periphery of the seal body 335 and the external periphery of the stem 340. This will create friction with the stem 340. Thus, when the seal member 331 is drawn proximally by the primary driver, the frictional engagement between the O-ring and the stem 340 will also draw the agitator 350 proximally.

In the agitation mode, the secondary driver operates on the stem 340 while the primary driver remains stationary. This will cause the agitator 350 to reciprocate in the barrel along the central longitudinal axis of the barrel, i.e. distally and proximally. The proximal end of the stem 340 has a blind bore which is internally threaded to facilitate connection with the PAL system. A cylindrical tube which surrounds the stem 340 is connected to the seal member 331 to provide a connection between the primary driver and the seal member 331.

Fourth Embodiment

FIG. 18 is similar in many respects to FIG. 17, including being driven by primary and secondary drivers as explained in connection with FIG. 17. The main difference between the fourth and third embodiments is that the axial length of the agitator 450 is much shorter in the fourth embodiment than the third and other embodiments. It was previously thought that the long length of the channels 354 facilitated mixing in the chamber. However, through experiments, it was determined that the long length was not critical nor particularly instrumental in mixing. The fourth embodiment was used to obtain the results of FIG. 16 discussed below.

CALA Water Sample:

To validate the automated liquid-liquid extraction on an auto-sampler, 2.5 mL and 4 mL LLE syringe devices were made and mounted on a PAL system which was programmed to carry out PCBc (polychlorinated biphenyl congeners) extraction from water samples. Canadian Association for Laboratory Accreditation Inc. (CALA) water sample was used to validate the automated LLE compared to MOECC solid phase extraction method (Ministry of Environment and Climate Change). The PAL system was set to aspirate 2.7 mL of sample and 0.3 mL of solvent (25% DCM in Hexane) and to mix the two solutions for 4 minutes (50 strokes/min). Experiments were repeated three times and FIG. 16 shows that the automated liquid-liquid extraction results are comparable with MOECC SPE results.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A liquid-liquid mixing device including:
a barrel having a proximal end and a distal end defining an axis extending therebetween, the barrel having a liquid port for drawing and dispensing liquid from the barrel;
a plunger assembly including:
a seal member that is reciprocably moveable proximally and distally along said axis in sealingly slidable engagement with the internal wall of the barrel to define a variable volume chamber therein in communication with the liquid port, and
an agitator reciprocably moveable in the variable volume chamber; and
a mode selector mechanism for selection between two or more modes of operation for the plunger assembly, including first and second modes, wherein the mode selector mechanism includes at least one locking mechanism which is selectively operable to restrain the seal member against movement proximally and distally relative to the barrel in the second mode, whereby, depending on the selected mode, on actuation of the plunger assembly, the agitator and the seal member move together, or the agitator is moveable relative to the seal member.

2. The liquid-liquid mixing device as claimed in claim 1 wherein the at least one locking mechanism is operative to facilitate adjustment between said two or more modes.

3. The liquid-liquid mixing device as claimed in claim 2 wherein the plunger assembly includes a stem connected to the agitator and the stem is selectively movable relative to the seal member depending on the selected mode.

4. The liquid-liquid mixing device as claimed in claim 3 wherein the stem passes through the seal member.

5. The liquid-liquid mixing device as claimed in claim 3 wherein the at least one locking mechanism is selectively operable to restrain the seal member against movement relative to the stem in the first mode.

6. The liquid-liquid mixing device as claimed in claim 1 wherein the barrel includes a flange portion and the at least one locking mechanism is selectively operable to secure the seal member to the flange portion in the second mode.

7. The liquid-liquid mixing device as claimed in claim 1 wherein the stem is attached to the agitator with the stem being reciprocably slidable relative to the seal member in the second mode.

8. The liquid-liquid mixing device as claimed in claim 2 wherein the at least at least one locking mechanism includes a locking member which is rotatable to select between said two or more modes.

9. The liquid-liquid mixing device as claimed in claim 8 wherein the locking member and the seal member are joined for relative rotatable movement about said axis and constrained against separation along said axis.

10. The liquid-liquid mixing device as claimed in claim 3 wherein the at least one locking mechanism includes a locking member which is rotatable to select between said two or more modes, wherein the locking member includes an axial passage through which the stem passes and a radial slot from the passage, wherein the stem and the barrel each include a projection radially offset from each other, wherein passage of each projection along the slot during actuation of the plunger assembly is permitted alternately depending on the selected rotational orientation of the locking member.

11. The liquid-liquid mixing device as claimed in claim 10 wherein the locking member comprises an elongate locking sleeve or locking collar which is rotatable about the stem.

12. The liquid-liquid mixing device as claimed in claim 10 wherein the projection on the stem and the projection on the barrel are disposed at one quarter revolution from each other such that one quarter revolution of the locking member is required to change mode.

13. The liquid-liquid mixing device as claimed in claim 10 wherein the locking member has a peripheral recess extending in an arc to accommodate the projection of the barrel and restrain the locking member against movement along said axis relative to the barrel.

14. The liquid-liquid mixing device as claimed in claim 10 wherein the locking member and the seal member are joined to permit relative rotatable movement about sale axis and constrained against separation along said axis.

15. The liquid-liquid mixing device as claimed in claim 14 wherein the locking member and the seal member are joined by projections extending from one of the locking member and the seal member into a circumferential annular recess in the other of the locking member and the seal member, to permit relative rotatable movement about said axis and restraint against separation along said axis.

16. The liquid-liquid mixing device as claimed in claim 1 where the plunger assembly is operable to aspirate or dispense liquid into or from the chamber in the first mode.

17. The liquid-liquid mixing device as claimed in claim 16 where plunger assembly is operable in the second mode to reciprocate the agitator in the chamber to mix liquids therein.

18. The liquid-liquid mixing device as claimed in claim 1 further including a valve for closing off or allowing liquid flow through the port.

19. The liquid-liquid mixing device as claimed in claim 1 wherein the agitator includes one or more end to end passages through which liquid in the chamber is forced as the agitator reciprocates in the chamber.

20. The liquid-liquid mixing device as claimed in claim 19 wherein the end to end passages in the agitator comprise a plurality of longitudinal grooves in an external surface of the agitator.

21. The liquid-liquid mixing device as claimed in claim 19 wherein the end to end passages in the agitator comprise capillary bores or other passages through the body of the agitator.

22. The liquid-liquid mixing device as claimed in claim 1 further including an external driver for the plunger assembly.

23. A liquid-liquid mixing device including:
a barrel having a proximal end and distal end defining an axis extending therebetween, the barrel including a liquid port for drawing and dispensing liquid from the barrel;
a seal member in sealingly slidable engagement with the internal wall of the barrel, the seal member being reciprocably moveable proximally and distally along the barrel to define a variable volume chamber therein in communication with the liquid port;
an agitator reciprocable moveable proximally and distally in the variable volume chamber, wherein the agitator is fixedly connected to a stem;
the device further including a mode selector mechanism for selection between two or more modes of operation including a first mode and second mode, whereby movement of the stem effects either movement of the agitator with the seal member, or movement of the agitator relative to the seal member and independently therefrom, depending on the selected mode of said two or more modes, wherein the mode selector mechanism includes at least one locking mechanism which is selectively operable to restrain the seal member against movement proximally and distally relative to the barrel in the second mode.

24. The liquid-liquid mixing device as claimed in claim 23 wherein the agitator and the seal member are disposed in the barrel with the agitator disposed more distally than the seal member.

25. The liquid-liquid mixing device as claimed in claim 23 wherein the agitator is fixedly connected to a stem and the stem passes through the seal member to the agitator.

26. The liquid-liquid mixing device as claimed in claim 25 wherein the agitator and the barrel are separately drivable by separate external drivers.

27. The liquid-liquid mixing device, as claimed in claim 23 wherein the at least one locking mechanism is operative to facilitate adjustment between said two or more modes.

28. The liquid-liquid mixing device as claimed in claim 27 wherein the at least one locking mechanism includes a locking member which is rotatable to select between said two or more modes.

29. The liquid-liquid mixing device as claimed in claim 28 wherein the locking member and the seal member are joined for relative rotatable movement about said axis and constrained against separation along said axis.

30. The liquid-liquid mixing device as claimed in claim 29 wherein the locking member includes an axial passage through which the stem passes and a radial slot from the passage, wherein the stem, and the barrel each include a projection, wherein passage of each projection along the slot as a result of movement of the stem is permitted alternately depending on the selected rotational orientation of the locking member.

31. The liquid-liquid mixing device as claimed in claim 30, wherein the locking member comprises a locking sleeve or locking collar which is rotatable about the stem.

32. The liquid-liquid mixing device as claimed in claim 31 wherein the projection on the stem and the projection on the barrel are rotationally offset such that revolution of the locking member by the rotational offset is required to change mode.

33. The liquid-liquid mixing device as claimed in claim 30 wherein the locking member has a peripheral recess extending in an arc to accommodate the projection of the barrel and restrain the locking member against movement along said axis relative to the barrel.

* * * * *